June 26, 1923.
R. W. McCLINTOCK ET AL
1,460,104
ELECTROLYTIC RECTIFIER
Filed Aug. 13, 1920
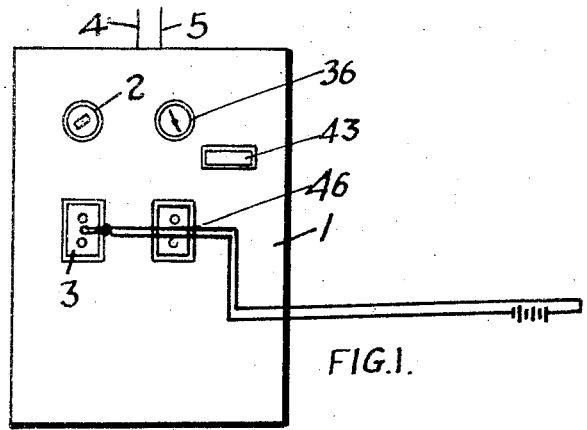
FIG.1.
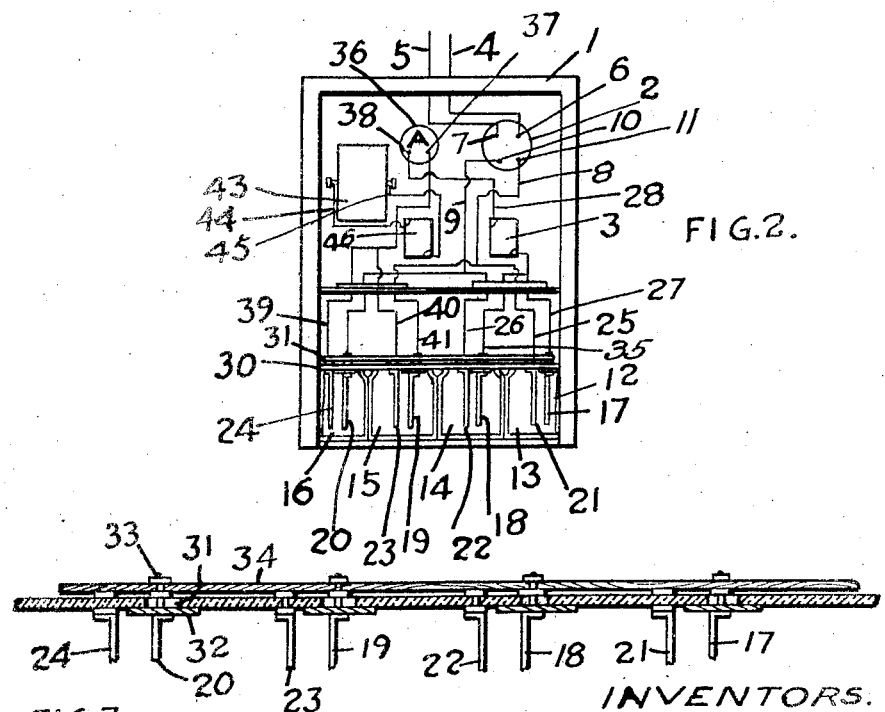
FIG.2.
FIG.3.
INVENTORS.
ROBERT W. McCLINTOCK.
DONALD McKINNON.

Patented June 26, 1923.

1,460,104

UNITED STATES PATENT OFFICE.

ROBERT WELLINGTON McCLINTOCK AND DONALD McKINNON, OF TORONTO, ONTARIO, CANADA.

ELECTROLYTIC RECTIFIER.

Application filed August 13, 1920. Serial No. 403,266.

*To all whom it may concern:*

Be it known that we, ROBERT WELLINGTON McCLINTOCK and DONALD McKINNON, both subjects of the King of Great Britain, and residents of the city of Toronto, in the county of York, in the Province of Ontario, Canada, have invented certain new and useful Improvements in Electrolytic Rectifiers, of which the following is the specification.

Our invention relates to improvements in devices for remagnetizing magneto magnets and the object of the invention is to devise means connected to an alternating current for transforming the current into a direct current whereby the magnets of a magneto of an internal combustion engine may be remagnetized quickly with the minimum amount of labor in order that it will have the highest possible efficiency.

A further object is to devise a device of the kind referred to above which in addition to being capable of remagnetizing magneto magnets can be used for recharging storage batteries.

A still further object is to devise means whereby the rectified current can be varied.

Our invention consists of a device for remagnetizing magneto magnets constructed and arranged all as hereinafter more particularly described and illustrated in the accompanying drawing in which:

Fig. 1 is a front elevation of our device.

Fig. 2 is a rear elevation of the device showing the rectifier cells in section.

Fig. 3 is a large sectional detail showing means for adjusting the plates of the rectifier to increase or decrease the resistance between the plates.

In the drawings like characters of reference indicate the corresponding parts in each figure.

1 indicates a casing which is provided with an open back and which is secured against the wall of the garage. 2 indicates a double pole indicating snap switch. 3 indicates a plug receptacle by which the device is connected to the terminals of the magneto or the battery. 4 and 5 are the wires of the alternating circuit. The wires 4 and 5 lead from the terminals 6 and 7 of the switch 2. 8 and 9 are wires leading from the opposing terminals of the switch 10 and 11. 12 is our rectifier provided with cells 13, 14, 15, and 16 in which are located adjustable electrode plates 17, 18, 19 and 20 preferably formed of aluminum. 21, 22, 23, and 24 are stationary lead electrode plates. 30 indicates the cover extending over the cells 13, 14, 15 and 16 and formed of an insulating material such as rubber. The plates 21, 22, 23 and 24 are secured in a stationary position to the cover 30. 31 indicates slots formed in the cover 30. 32 indicates slide plates bearing against the lower face of the cover and carrying the aluminum plates 17, 18, 19 and 20. 33 indicates studs extending from each plate 32 through the slots 31. The studs 33 are connected together by a wooden rod 34.

By this means all the plates 17, 18, 19 and 20 may be moved either towards or away from the stationary plates so as to increase the resistance. It will of course be understood that the cells are filled with a suitable electrolyte such as a solution of approximately 24 ounces of sodium sulphate, and 6 ounces of sodium phosphate to four quarts of water. 25 is a bridging wire connecting the stationary plate 21 to the movable plate 19. 26 is a bridging wire connecting the stationary plate 22 with the movable plate 20. 27 is a wire connecting the movable plate 17 with one terminal of the plug receptacle 3. 28 is a wire leading from the other terminal of the plug receptacle 3. 35 is a wire leading from the plate 18 being tapped at its opposite end into the wire 27. 36 is an ammeter provided with terminals 37 and 38. The wire 28 hereinbefore described is connected with the terminal 38. 39 is a wire connecting the other terminal of the ammeter with the plate 24.

When it is desired to remagnetize the magnets of the magneto the plug of the lead wire leading from the terminals of the battery or magneto is inserted in the plug receptacle 3 and the switch 2 turned in the closed position thereby forming the following circuit extending from the wire 4 and switch terminals 6 to the terminal 11 and wire 8 leading to the bridging wire 25, then through the stationary lead plate 21, movable aluminum plate 17 and wire 27, to one terminal of the plug receptacle which is connected by the plug to the other terminal and the circuit passing from thence to the wire 28 to the terminals 38 and 37 of the ammeter 36 then by wire 39 to plate 24, from thence to plate 20, to the bridging wire 26 and then by wire 9 to the other terminal 10 of the switch crossing the switch at the terminals 7 and out by wire 5. At the junction of the wires 9 and 26 the circuit divides a portion of the current passing through the plates 22 and 18 to the wire 27 leading to the plug receptacle. The circuit passing through the wire 39 also divides, a portion of the current passing through the wire 40, plate 23 and plate 19, wire 41 leading back into the circuit at the junction of the wire 8 with the bridging wire 25.

It is found that the magnets of magnetos become demagnetized and heretofore in order to remagnetize the magneto it had to be removed and replaced involving the expenditure of two days' work. By our device all that is necessary to do is to connect the terminals of the magneto to the plug receptacle 3 and to turn on the current by the switch 2. The current passing through the electrolytic rectifier is transformed from alternating current into a direct current with which the magneto is remagnetized the whole operation being accomplished in a few minutes the result being that the magneto is in a much higher state of efficiency than if it were remagnetized in the ordinary way. This results in a hotter spark with a consequent increase in power.

If desired a tester 43 may be employed in connection with our device the terminals of which are connected by wires 44 and 45 to the plug receptacle 46. When it is desired to test the magneto the plug is inserted in the plug receptacle 46 and connected to the magneto terminal in the same way as when being remagnetized.

Although the device is particularly applicable to use in remagnetizing magnetos it will be seen that it can be used as a rectifier for charging batteries.

Further the current in either case can be readily varied by moving the movable electrodes closer to or away from the stationary electrodes, thus descreasing or increasing the resistance.

What we claim as our invention is:

1. In a device of the class described, the combination with the rectifier jars, of an insulating cover for the jars, depending stationary electrodes secured to the insulating cover and extending down into the electrolyte in jars, laterally movable electrodes slidably supported on the cover and means for actuating the movable electrodes in unison.

2. In a device of the class described, the combination with the rectifier jars of an insulating cover for the jars, a series of stationary plate electrodes carried by the cover, a movable bar member located over the cover and a series of plate electrodes carried by the bar opposing the stationary plate electrodes so as to be movable simultaneously to and from such stationary electrodes.

ROBERT WELLINGTON McCLINTOCK.
DONALD McKINNON.